Patented May 1, 1934

1,956,784

UNITED STATES PATENT OFFICE 1,956,784

CONDIMENTATION AND COLORATION OF FOODSTUFFS

Hugh E. Allen, Chicago, Ill., assignor of one-half to Albert G. McCaleb, Evanston, Ill.

No Drawing. Application February 24, 1932, Serial No. 594,964

19 Claims. (Cl. 99—5)

My invention relates to the condimentation and coloration of foodstuffs,—the present invention providing a composition which is admirably adapted for use in the manufacture of ground meat products such as sausages, frankfurters, bologna, meat loaves, and the like. However, the composition of the present invention may be used in the preparation of foodstuffs other than ground meat products.

The composition of the present invention comprises as one of its essential ingredients a material which is new and useful per se, namely, a specially prepared coloring material consisting of cured and wholly or partially dehydrated animal blood. This coloring material, made from animal blood, is hereinafter claimed per se, as well as in combination with the other materials with which it is preferably associated when the desideratum is a material which will both season and color ground meat products.

One of the objects of the present invention is to provide an improved seasoning material of the type described and claimed in United States Letters Patent No. 1,781,154, granted to me on November 11, 1930.

Another object of the invention is to provide a new and useful coloring material made from the blood of an edible animal.

Another object of the invention is to provide a suitable method whereby to produce a coloring material from animal blood.

A further object of the invention is to provide an improved seasoning and coloring material which includes a suitable dispersion base such as sugar, seasoning agents such as the essential oils or distilled essences of spices and the oleoresins of peppers, and a coloring agent of specially prepared animal blood,—the several ingredients being so blended and physically related to each other as to season and color ground meat products in a most satisfactory and expeditious manner.

These and other features, objects and advantages of the present invention will appear from the following detailed description.

The first phase in the production of the seasoning and coloring composition of the present invention is the preparation of the coloring material, which is one of the very essential ingredients of the composition. This coloring material includes, and depends for its efficacy upon, nature's own material for tinting animal tissue, i. e., the hæmoglobin of the blood. In the coloring material, prepared as hereinafter explained, the hæmoglobin is believed to appear entirely or largely as nitroso hæmoglobin by reason of its reaction with the sodium salts, hereinafter mentioned.

In preparing the coloring material, I make use of a curing agent of which six hundred (600) pounds may be made in accordance with the following formula:

| | Pounds |
|---|---|
| Sodium nitrite (NaNO$_2$) | 30 |
| Sodium nitrate (NaNO$_3$) | 10$\frac{1}{5}$ |
| Sodium chloride (NaCl) | 559$\frac{4}{5}$ |

The above mentioned sodium salts are thoroughly milled together and are preferably reduced to the approximate fineness of free flowing table salt. The relative proportions of these sodium salts may be varied. However, the precise formula above given has been found to be one which affords exceptionally satisfactory results when practicing the now-to-be-described method for producing a satisfactory coloring material from animal blood.

In preparing the said coloring material, I make use of animal blood while fresh and preferably before it has lost any considerable part of the natural heat of the animal. Beef blood is preferable for my purpose,—however, the blood of other edible animals may be employed.

To one hundred (100) pounds of the fresh warm blood I add approximately five (5) ounces of the curing agent previously described. The blood, with the curing agent added, is then immediately agitated for a period of approximately ten minutes. The blood under treatment is then preferably permitted to remain in a warm quiescent condition for the remainder of two hours. During both the period of agitation and the period of warm quiescence the temperature of the blood is not permitted to fall below seventy degrees Fahrenheit,—heat being added if necessary to keep the blood at or above seventy degrees Fahrenheit during these periods.

At the end of the period of warm quiescense, the blood under treatment is placed in a cooler, where its temperature is reduced to from thirty-six degrees Fahrenheit to forty-two degrees Fahrenheit, and there maintained until the blood under treatment becomes very bright red in color. The most intense, and for my purpose most desirable, bright red color usually is realized after the blood under treatment has remained in the cooler something between twenty-four and forty-eight hours. The development of the intensely bright red color to which reference has been made may be regarded as indicative that the blood solids have been properly cured and that a maximum yield of nitroso hæmoglobin has been realized from the action of the sodium salts of the curing agent upon the hæmoglobin of the blood.

The treated blood, with its hæmoglobin converted into nitroso hæmoglobin, as it comes from the cooler, and if desirable without further treatment, may be used for coloring certain foods or ingredients of foods. For example, the blood as it comes from the cooler, or in a more or less concentrated form produced by partial evaporation of its aqueous constituent, may be added to any one of the so-called "liquid seasonings", which were formerly very popular, and are even now sometimes used, in the seasoning of ground meat products,—said liquid seasonings then consisting of the oleoresins of peppers and the essention oils of spices and/or distilled spice essences whipped into an emulsion with the treated blood, a suitable vegetable gum and water. Moreover, the treated blood, as it comes from the cooler, or in a more or less concentrated liquid state, may be added to ground meats or other food products to lend a pleasing, natural color to the same. I prefer, however, to reduce the treated blood to the state of a powder, so that it may form one of the constituents of a dry seasoning and coloring composition which may be applied to meat chunks, trimmings, etc., either before or while the latter are being ground.

The blood powder, which is bright red in color, is produced by thoroughly dehydrating the blood after it comes from the cooler.

While I do not limit myself to any particular means for effecting the dehydration of the treated blood, I have found that such dehydration is very satisfactorily accomplished by evaporation in a vacuum pan and/or by spraying the treated blood into a dry heated air stream.

Having in hand the aforesaid powder made from specially treated blood,—a coloring material which by nature is peculiarly adapted for the tinting of food products made from animal tissues—I am ready to proceed with the preparation of an ideal composition wherewith both to season and color ground meats from which are made sausage, frankfurters, bologna, meat loaves and the like.

As a specific example of a seasoning and coloring composition, especially adapted for use in the manufacture of ground meat products of the kind last above mentioned, I make a mixture, in which the proportions of the several ingredients (by weight) are as follows:

(No. 1.) The aforesaid powder produced from animal blood _____ 25%
(No. 2.) Essential oils and/or distilled essences of spices and oleoresins of peppers, of the preferred varieties, and in the desired proportions _____ 3% to 10%
(No. 3.) Coarse granulated sugar (preferably sucrose although other kinds of sugar may be employed) _____65% to 72%

The aforesaid mixture of the blood powder, essential oils and/or essences of spices, oleoresins of peppers, and coarse granulated sugar, is then placed in a grinding mill, preferably a hammer mill, and there operated upon until the initially coarse granulated sugar has been reduced to a semi-pulverulent state. By a semi-pulverulent state I mean that degree of fineness which is greater than that of any of the common commercial forms of granulated sugar, but not of that degree of fineness which characterizes the common commercial form of pulverized sugar.

When the aforesaid grinding operation has been accomplished, the spice oils and/or essences and the oleoresins are thoroughly distributed through and absorbed by the sugar and the blood powder, and the blood powder and the sugar are brought into a very intimate relation each to the other. I now have a seasoning and coloring composition which may be applied to meat chunks and trimmings before grinding; a seasoning and coloring material which in its entirety is meat soluble; a seasoning and coloring material in which the minute globules of essential oils and oleoresins are associated with a carrier consisting of sugar and blood powder which, by their dissolving in the meats, permit the essential oils and/or essences and oleoresins most effectively and uniformly to yield their flavors and aromas to the meats with and into which the seasoning and coloring material is ground. The nitroso hæmoglobin of the seasoning and coloring composition, within the range of my experience, is the most satisfactory agent which has ever been devised or discovered for imparting a natural, pleasing color to ground meat products, together with a certain flavor, characteristic of animal blood, which all ground meat products should have, but which many of them lack, due to an undesirable loss of blood content before being subjected to the grinding operation.

In practice from one-half (½) to one (1) pound of my improved seasoning and coloring composition is added to approximately one hundred (100) pounds of meat which is to be ground into sausage, bologna, meat loaves, or the like. In these proportions, the sugar is imperceptible to the taste, as sugar, but does function to restore the palatability of any reasonably small portions of old off-taste meat which may form part of the bulk of meats to which the seasoning and coloring material is applied.

By the term "nitrogen oxygen acid" used in the appended claims, I intend to denote nitric and nitrous acids, the salts of which are used in accordance with this invention.

Having thus described the improvements of the present invention, what I claim is new and desire to secure by United States Letters Patent is:

1. A substantially dry seasoning and coloring composition comprising dehydrated animal blood wherein the hæmoglobin is in the form of nitroso hæmoglobin, sugar, and spice oils, ground together, substantially as described.

2. A substantially dry seasoning and coloring composition comprising nitroso-cured and dehydrafted animal blood, sugar, and non-fibrous flavoring ingredients, ground into intimate relationship each with the others.

3. A seasoning and coloring composition comprising animal blood wherein the hæmoglobin is in the form of nitroso hæmoglobin, oleoresins of peppers, and sugar, thoroughly mixed together.

4. A seasoning and coloring composition comprising a major quantity of sugar, a lesser quantity of nitroso-cured and dehydrated animal blood, and a least quantity of non-fibrous flavoring ingredients, intimately intermixed.

5. A material for admixture with foodstuffs to tint the same, said material being in the form of a dark red powder consisting of nitroso-cured and dehydrated animal blood.

6. A material for admixture with foodstuffs to tint the same, said material consisting of dehydrated animal blood in which the hæmoglobin is in the form of nitroso hæmoglobin.

7. A material for admixture with foodstuffs to tint the same, said material consisting of animal blood in which the hæmoglobin is in the form of nitroso hæmoglobin.

8. The method of producing a material for tinting foodstuffs which consists in curing fresh animal blood with a salt of the group consisting of sodium nitrate and sodium nitrite.

9. The method of producing a material for tinting foodstuffs which consists in applying a salt of the group consisting of sodium nitrate and sodium nitrite to fresh animal blood to convert the hæmoglobin of the blood into nitroso hæmoglobin.

10. The method of producing a material wherewith to tint foodstuffs, said method consisting in curing fresh animal blood with a salt of the group consisting of sodium nitrate and sodium nitrite and then dehydrating the cured blood.

11. The method of producing a material wherewith to tint foodstuffs, said method consisting in applying a salt of the group consisting of sodium nitrate and sodium nitrite to fresh animal blood to convert the hæmoglobin of the blood into nitroso hæmoglobin and then dehydrating the blood so treated.

12. The method of producing a material for admixture with foodstuffs to tint the same, said method consisting in treating fresh animal blood with a salt of the group consisting of sodium nitrate and sodium nitrite to convert the hæmoglobin of the blood into nitroso hæmoglobin and then dehydrating the treated blood.

13. The method of producing a material for admixture with foodstuffs to tint the same, said method consisting in treating fresh animal blood with sodium nitrite and a diluent salt to convert the hæmoglobin of the blood into nitroso hæmoglobin.

14. The method of producing a material for admixture with foodstuffs to tint the same, said method consisting in adding sodium nitrite and a diluent salt to fresh animal blood while maintaining the temperature of the blood at or above seventy degrees Fahrenheit, agitating the material, permitting the material to stand warm and quiescent for a substantial period of time and then refrigerating the material.

15. The method of producing a material for admixture with foodstuffs to tint the same, said method consisting in adding sodium nitrite and a diluent salt to fresh animal blood while maintaining the temperature of the blood at or above seventy degrees Fahrenheit, agitating the material, permitting the material to stand warm and quiescent for a substantial period of time, refrigerating the material, and finally dehydrating the treated blood.

16. The method of improving the condition of ground meat products which consists in mixing with the same dehydrated animal blood in which the hæmoglobin has been converted to nitroso hæmoglobin.

17. The method of improving the condition of ground meat products which consists in mixing with the same animal blood wherein the hæmoglobin has been converted to nitroso hæmoglobin.

18. A material for the mixture with foodstuffs to tint the same, said material comprising nitroso cured and dehydrated animal blood hæmoglobin.

19. The method of improving the condition of ground meat products which consists in mixing with the same a dehydrated powdered product derived from animal blood in which the hæmoglobin is in the form of nitroso-hæmoglobin.

HUGH E. ALLEN.